United States Patent
McWhirter

[15] 3,670,887
[45] June 20, 1972

[54] AEROBIC DIGESTION OF SLUDGE WITH OXYGEN

[72] Inventor: John Ruben McWhirter, Williamsville, N.Y.

[73] Assignee: Union Carbide Corporation, New York, N.Y.

[22] Filed: Dec. 14, 1970

[21] Appl. No.: 97,706

Related U.S. Application Data

[63] Continuation-in-part of Ser. Nos. 838,499, July 2, 1969, Pat. No. 3,547,814, and Ser. No. 838,500, July 2, 1969, Pat. No. 3,547,815.

[52] U.S. Cl. .................................... 210/5, 210/7, 210/15, 210/195, 210/220
[51] Int. Cl. .................................................... C02c 1/06
[58] Field of Search ........................ 210/3–9, 14, 15, 210/194–197, 220, 221

[56] References Cited

UNITED STATES PATENTS

| | | | |
|---|---|---|---|
| 2,380,465 | 7/1945 | Proudman | 210/220 X |
| 3,047,492 | 7/1962 | Gambrel | 210/7 |
| 3,054,602 | 9/1962 | Proudman | 210/15 X |
| 3,133,017 | 5/1964 | Lambeth | 210/15 X |
| 3,342,727 | 9/1967 | Bringle | 210/220 X |
| 3,356,609 | 12/1967 | Bruemmer | 210/7 |
| 3,401,113 | 9/1968 | Pruessner et al. | 210/15 X |
| 3,412,017 | 11/1968 | Abson et al. | 210/7 |
| 3,505,213 | 5/1970 | Anthony et al. | 210/15 |

FOREIGN PATENTS OR APPLICATIONS 415,775  9/1934  Great Britain..........................210/220

OTHER PUBLICATIONS

Grant et al.; The Oxygen Requirements of the Activated Sludge Process, Sewage Works, J., Vol. 2, April, 1930, pp. 228–244.

Pfeffer, J. T. et al.; Oxygen–Enriched Air for Biological Waste Treatment, Water & Sewage Works, Vol. 112, October, 1965, pp. 381–384.

Primary Examiner—Michael Rogers
Attorney—Paul A. Rose, Harrie M. Humphreys, John C. Le Fever and Lawrence G. Kastriner

[57] ABSTRACT

BOD-containing water such as sewage is aerated with oxygen and unrecycled sludge is digested with unconsumed oxygen from the aeration.

11 Claims, 6 Drawing Figures

PATENTED JUN 20 1972  3,670,887

INVENTOR
John R. McWhirter
BY John C. Kramer
ATTORNEY

AEROBIC DIGESTION OF SLUDGE WITH OXYGEN

CROSS-REFERENCE TO RELATED APPLICATIONS

This application is a continuation-in-part of, Ser. No. 838,499 and Ser. No. 838,500 each filed July 2, 1969 and issued Dec. 15, 1970 as U.S. Pat. Nos. 3,547,814 and 3,547,815 in the name of John R. McWhirter.

BACKGROUND OF THE INVENTION

This invention relates to a process for integrated aeration of BOD-containing water and aerobic digestion of activated sludge with oxygen.

In the activated sludge process, there is usually a net positive production of volatile suspended solids (MLVSS), i.e., the rate of cell synthesis exceeds the rate of cell destruction. Therefore, an increasing inventory of sludge builds up and the excess activated sludge must be discarded from the process continuously or periodically. In common practice, the excess sludge is accumulated in large domed digesters where the sludge is fermented anaerobically for 20-30 days. This reduces the solid residue to a reasonably stable form which can be discarded as land fill without creating a nuisance.

Alternatively, the excess sludge can be digested aerobically. Air is usually employed for this purpose and the liquid-solid contact time in the digester is about 10-15 days. The use of oxygen rather than air for aerobic sludge digestion has been proposed by the prior art. However, as in the case of the activated sludge process, efficient utilization of such oxygen has not been obtained and the cost has been prohibitive.

It is an object of this invention to provide an improved process for aerobic digestion of activated sludge with oxygen, which is characterized by high oxygen utilization.

Another object is to provide a process which is characterized by low power consumption.

Other objects and advantages of this invention will be apparent from the ensuing disclosure and appended claims.

SUMMARY

This invention relates to a process for aerobic digestion of activated sludge with oxygen which is characterized by high oxygen utilization and low power consumption.

This process is an improvement in the treatment of BOD-containing water as widely practiced, wherein the latter is aerated in contact with activated sludge, the sludge is separated and at least part thereof is recycled to the aeration zone as the aforementioned activated sludge. In this improvement, first gas comprising at least 60 percent oxygen (by volume) is introduced and mixed as the aeration gas with the BOD-containing water and recycled sludge. One of these fluids is simultaneously continuously recirculated against the other fluids in the aeration zone. The liquid-solid contact time in the aeration zone is between 30 minutes and 24 hours, and the fluids are provided in sufficient quantity and rate to maintain the dissolved oxygen content (DO) of the mixed liquor above about 0.5 ppm.

The mixed liquor is thereafter separated into purified liquid and activated sludge, and the unconsumed oxygen-containing gas is discharged from the aeration zone. Second gas is provided having oxygen concentration at least 0.70 times the first gas oxygen concentration and at least in part comprising the aforementioned unconsumed oxygen-containing gas from the aeration zone.

At least 85 percent by weight (dry basis) of the activated sludge separated from the mixed liquor is returned to the aeration as the aforementioned recycled sludge. The fraction recycled refers to the average fraction recycled over a period of operation and allows for the fact that the recycle rate may vary from day to day or from hour to hour, and that the quantity of sludge stored in the separation facility may vary correspondingly.

The second gas and the unreturned activated sludge are introduced to a digestion zone and mixed for liquid-solid contact time of at least 96 hours while simultaneously continuously recirculating one of the fluids in this zone against the other fluids. Waste sludge residue and third gas comprising at least 21 percent oxygen are thereafter discharged from the digestion zone.

DESCRIPTION OF PREFERRED EMBODIMENTS

Figure 1:
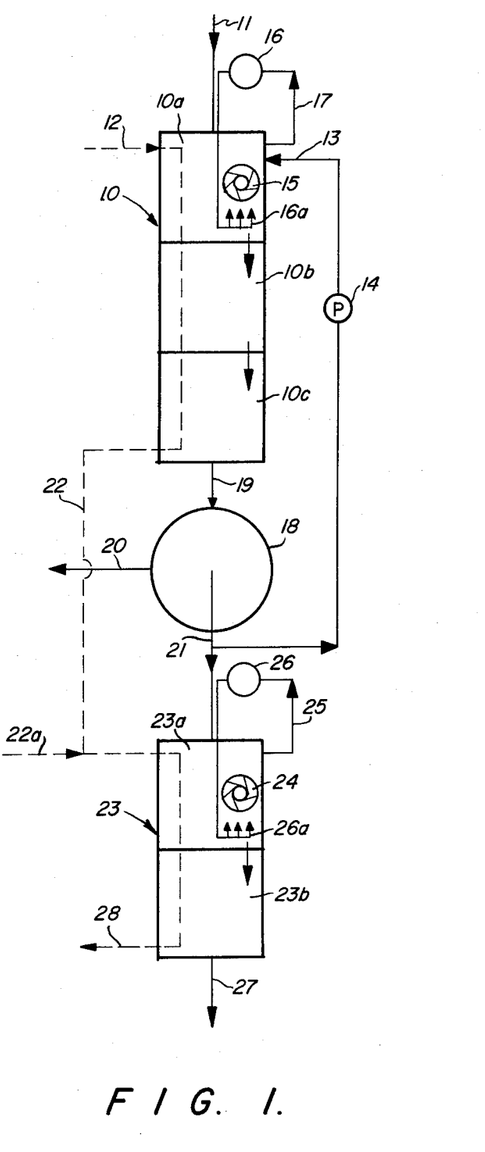
FIG. 1 is a schematic view of apparatus arranged to practice one embodiment wherein a clarifier is located intermediate the aeration zone and the digestion zone.

Referring now to FIG. 1, BOD-containing water as for example sewage enters aeration zone 10 through conduit 11. An oxygen gas source comprising at least 50 percent oxygen enters zone 10 through conduit 12. Activated sludge also enters zone 10 through conduit 13 having pump 14 therein.

The aforementioned streams are intimately mixed in aeration zone 10 by mechanical agitation means 15. The latter may comprises motor-driven impellers located near the liquid surface or submerged below the surface, and the oxygen gas may be introduced through conduit 12 either above or below the liquid. Such apparatus is well-known to those skilled in the art and should be selected to achieve high contact area between the fluids with minimal work expenditure. If the oxygen gas is sparged into the liquid, the bubbles should be small so that their total surface area is large and their buoyancy is low. Dissolution of oxygen is also aided by submerging the gas dispensing means to a depth in the liquid where the hydrostatic effect is significant.

Means are provided for continuously recirculating one fluid against the other fluids in aeration zone 10. For example pump 16 joined to the gas space by conduit 17 recirculates aeration gas to the lower portion of the zone for release as small gas bubbles through sparger. Aerating devices are commonly rated by the so-called "air standard transfer efficiency" which identifies the capability of the device to dissolve oxygen from air into zero DO tap water at 1 atmosphere pressure and 20° C. Suitable devices are those which have an air standard transfer efficiency of at least 1.5 lb. $O_2$ per HP-hr. For these purposes the power used in rating the device is the total power consumed both for agitating the liquor and for gas-liquor contacting.

Although aeration zone 10 may comprises a single chamber it preferably comprises a multiplicity of stages 10a, 10b, and 10c, each having mechanical agitation means 15 and fluid recirculation means 16 (but for simplicity not illustrated in each stage). The unconsumed oxygen-containing gas from each aeration stage is preferably discharged therefrom and introduced to the next succeeding stage as the aeration gas (illustrated by a dotted line). Similarly, oxygenated liquor from each stage is discharged and preferably introduced to the next succeeding stage in cocurrent flow relation with the unconsumed oxygen-containing gas for mixing therewith and recirculation of one fluid against the other fluids. Stage-to-stage oxygenated liquor flow is illustrated by solid arrows extending through the stage partitions. Cocurrent gas-liquor flow through a multiplicity of aeration stages is preferred to satisfy the inherent variation in BOD of the water to be treated and of the succeeding partially oxygenated liquor. The feed gas representing the highest purity oxygen is contacted with the feed water in the first stage. Accordingly, the first or feed gas stage has the highest oxygen partial pressure and thus the highest oxygen transfer potential. Therefore the high oxygen demand in this stage can be supplied without excessive power consumption.

The oxygen gas is introduced through conduit 12 to aeration zone 10 at sufficient rate to maintain the dissolved oxygen content of the mixed liquor above about 0.5 ppm. Oxygen is consumed at a rapid rate and with conventional air aeration the dissolved oxygen level in the aeration zone drops to near zero and cannot be maintained at levels suitable for aerobic micro-organisms. This is overcome in part by using an aerating gas comprising at least 60 percent oxygen and preferably at least 90 percent oxygen. Also, the gas must be mixed with the returned activated sludge and BOD-containing water in an efficient manner to create a large interfacial area with minimal work on the fluids. Another feature of the process contributing to the dissolved oxygen level control is the aforementioned continuous recirculation of one fluid against the other fluids. The dissolved oxygen content of the aeration and digestion zones preferably should not exceed about 10 ppm. because the work expended in achieving higher DO concentrations would tend to cause excessive attrition of the bacterial floc, reducing its agglomerate size and impairing its settling properties. Stated otherwise, the floc particles would be so small that the effluent becomes turbid and unsuitable for discharge into receiving waters.

In the activated sudge process, the recycled sludge consists essentially of flocculent agglomerates of aerobic organisms which have the ability, in the presence of sufficient dissolved oxygen, to first adsorb, then assimilate and oxidize the organic material of the feed water. This adsorption-assimilation sequence occurs in the aeration zone of the present process, and in the FIG. 1 embodiment the sequence is substantially completed upstream of separation zone 18. The liquid-solid contact time in aeration zone 10 for organic food adsorption-assimilation is between 30 minutes and 24 hours. This time varies depending upon the strength (BOD content) of the waste water, the type of pollutent, solids level in aeration and temperature. A maximum retention period of 24 hours will usually provide adequate time to remove BOD from effluent, activate the sludge, and perform a reasonable degree of auto-oxidation if desired. Where several aeration stages are employed, the retention period in the aeration zone refers to the total time the biomass solids (the total bacteria present) together with the BOD of the feed water are held in all aeration stages. In the FIG. 1 embodiment where the aeration zone 10 is entirely upstream of the clarifier 18, the contact time is calculated as the total liquid volume of stages 10a, 10b and 10c divided by the volumetric flow rate of combined BOD-containing feed water and activated sludge recycle. In the FIG. 2 embodiment wherein the aeration zone 10 is partly upstream and partly downstream clarifier 18 (as discussed hereinafter in detail), the contact time for a given quantity of BOD plus biomass is calculated as the sum of the contact times upstream and downstream of the intermediate clarifier. The upstream contact time is calculated by dividing the upstream liquid volume of stages 10a and 10b by the volumetric flow rate of combined BOD-containing feed water and activated sludge recycle. The downstream contact time is calculated by dividing the downstream liquid volume of stage 10c by the sludge discharge rate from the clarifier flowing to stage 10c.

If it is desired to extend oxygen treatment on the biomass beyond the period required to assimilate and oxidize the waste water's BOD, then the fraction of the organisms of the sludge which themselves are destroyed and consumed by biological oxidation can become significant. This auto-oxidation phenomenon (endogenous respiration) is described more completely in U.S. Pat. No. 3,547,814. To the extent that auto-oxidation is practiced in the aeration zone the load on the digestion zone will be reduced. However, carrying auto-oxidation to an extreme in the aeration zone should be avoided because it reduces the activity of the biomass to be recycled in the return sludge and impairs its settlability. Moreover, retaining the treated biomass under long term aeration is expensive because the total quantity of biomass undergoing treatment is large relative to the excess sludge stream, and aeration basins become prohibitively large.

If the sole objective is to assimilate and oxidize the BOD of the influent BOD-containing water, then a relatively short contact time will suffice. Virtually complete assimilation of BOD has been experimentally achieved on municipal waste after two stages of aeration with 99.5 percent oxygen feed gas and cocurrent liquid-solid flow after a contact time of 37 ½ minutes in each stage or 75 minutes total. The effluent from the second stage was low in BOD (e.g. 20–35 ppm.) and the sludge stabilized and well settled. In other tests wherein some auto-oxidation occurred, the total contact time was about 2.5 hours for three stages (50 minutes/stage) of cocurrent flow, followed by clarification after the third stage. In another test series with auto-oxidation and four stages of cocurrent flow and clarification after the fourth stage, the total contact time was 2.7 hours or 40.5 minutes per stage. BOD determinations made on the supernatent liquid from each stage indicated that treatment was essentially complete after two stages (total of 81 minutes aeration) and furthermore, that the differences in BOD between the first and second stages was almost wholly accounted for by the completely mixed character (non-plug flow character) of the individual stages. It follows that had the first stage (40.5 minutes) been subdivided into two series stages of 20.25 minutes each, the purification of the water by adsorption and assimilation of BOD would have been largely complete after the first of the sub-stages (20.25 minutes aeration). It also appears that a total aeration contact time for a six stage system having these same characteristics may be 1.5 hours (15 minutes per stage). A total contact time of at least 30 minutes is necessary for oxygen absorption and BOD assimilation with the average municipal waste to reduce the BOD of the purified liquid to an acceptable level. A total contact time of less than 180 minutes usually provides substantial reduction of sludge production if auto-oxidation is to be practiced, permits avoidance of settling problems, and still permits a substantial reduction in aeration chamber capacity as compared with conventional practice. Present activated sludge plants for municipal wastes employing air aeration are believed to operate with total aeration contact time of 180–360 minutes.

As indicated above the aforementioned contact times are satisfactory for relatively low strength municipal waste liquids having up to about 300 ppm. BOD. For higher strength wastes as for example those discharged from petro chemical plants, longer contact times on the order of 5–12 hours are necessary to yield an effluent of comparable purity.

In the practice of this invention, it is preferred to maintain high suspended solids concentration in the aeration zone. The BOD-containing water - activated sludge volatile suspended solids content is preferably at least 3,000 ppm. and most desirably 5,000–9,000 ppm. One reason for this preference is that the solids concentration in the aeration zone affects the rates of the biochemical reactions occurring in the method. In the treatment of municipal sewage, the suspended solids comprise: (1) biologically oxidizable organic material, (2) non-biologically oxidizable organic material, and (3) non-oxidizable non-organic material. The non-organic material such as sand and grit, and the non-biologically oxidizable material such as polyethylene particles or paper are undesirable but unavoidable components of the BOD-containing water, e.g., sewage, entering the aeration zone. Normally relatively large particles, e.g., wood chips, are usually removed in a pretreatment step.

The major fraction of the total solids in the mixed liquor, e.g., 70 percent thereof, consists of bacterial floc (biomass) in the activated sludge recirculated from the clarifier to the aeration zone. The higher the concentration of bacteria, the more rapid will be the adsorption and assimilation of BOD, assuming other requirements are also met such as dissolved oxygen supply.

Returning now to FIG. 1, the mixed oxygenated liquor is discharged from aeration zone 10 and passed through conduit 19 to the aforementioned clarifier 18 for separation into supernatent liquid and activated sludge. The former is drawn off through conduit 20 and the activated sludge is discharged from the lower end through conduit 21. At least 85 percent by weight and preferably at least 95 percent of the activated sludge separated as stream 21 is returned through conduit 13 to aeration zone 10 as the source of active bacteria. Where several aeration stages are provided the activated sludge is recycled to the first stage 10a where the oxygen gas and the BOD-containing feed water are also introduced. The activated sludge preferably has 12,000 to 50,000 ppm. total suspended solids content (MLSS) and is preferably recycled to the aeration zone at flow rate relative to the BOD-containing feed water such that the recycling sludge/BOD-containing feed water volume ratio is 0.1 to 0.5.

The excess unreturned activated sludge not required to sustain the solids level in zone 10 is withdrawn from the process to the digestion zone 23. The excess sludge is a small stream relative to the recycle sludge stream. The rate at which cells are wasted from the process cannot continuously exceed the rate of net cell production. If this occurs, the essential micro-organisms will be lost and purification will cease. Only a fraction of the BOD feed to the system is used for synthesis of new cells and a fraction of cells already existent in the system is destroyed by auto-oxidation. The excess cells often comprise on the order of 1 percent of the cells recirculated back to the aeration zone. It is reported that in high rate activated sludge processes characterized by low solids level in aeration and rapid cell synthesis, the excess cells may comprise a fraction on the order of 10 percent of the cells recycled. If cell wasting exceeds 15 percent (and less than 85 percent by weight of the activated sludge is returned to the aeration zone), the size and operating cost of the digestion equipment become unnecessarily burdensome.

As stated previously, the percentage of the sludge which is wasted to the digestion zone is an average quantity over a period of operation. In normal operation of an activated sludge system the schedule of sludge wasting may be variable and/or intermittent, and the rate at which sludge is recycled to aeration zone 10 may also be varied, e.g., in accordance with changes in the rate of feed water introduction. When sludge flow rates are varied the inventory of separated sludge held in clarifier 18 will vary correspondingly.

Unconsumed oxygen-containing gas is also discharged into conduit 22 from aeration zone 10, and in particular from the final stage 10c if multiple aeration stages are employed. Additional oxygen gas may be introduced to the system through conduit 22a or directly to the digestion zone. The unconsumed oxygen-containing gas in conduit 22 and any fresh oxygen gas from conduit 22a together comprises the second gas having oxygen concentration at least 0.70 times the oxygen concentration of the first gas introduced to the aeration zone through conduit 12. Even through the oxygen consumed from the gas in the aeration zone may be equal to that consumed in the digestion zone, the oxygen purity change in the gas across the aeration zone will be far smaller than the change across the digestion zone. This is due to the relatively heavy evolution of nitrogen and carbon dioxide from the small volume of liquid in the digestion zone. In a preferred embodiment, the oxygen purity of gas fed to the digestion zone should be at least 80 percent of the oxygen feed gas purity to the aeration zone. An abrupt drop in oxygen purity occurs in the digestion zone, and without relatively high oxygen purity gas available to the digestion, prohibitively low oxygen partial pressure and prohibitively high power consumption will result.

The unreturned activated sludge in conduit 21 and the second gas in conduit 22 are both introduced to digestion zone 23 for mixing therein for liquid-solid contact time of at least 96 hours. During this extended period, most of the excess biomass is destroyed by endogenous respiration and the sludge residue is rendered substantially inert. During this period, one of the fluids is simultaneously continuously recirculated against the other fluids. Mixing is facilitated by means 24 which can be identical to aeration zone mixer 15 or may be a different type preferred for moving the more dense excess activated sludge. The illustrated fluid recirculation system comprising withdrawal-return conduit 25, pump 26 and gas sparger 26a is identical to the aeration zone fluid recirculation system but this is not essential. By way of illustrating alternative apparatus, rotating surface-type impellers might be used in the aeration zone 10 to serve both the mixing and the fluid recirculation functions by throwing relatively massive sheets or streams of liquid into the gas.

Multiple digestion stages 23a and 23b are preferred for the same reasons as multiple aeration stages 10a, 10b and 10c. Each digestion stage is provided with mixing and fluid recirculation means. The unconsumed oxygen-containing gas and the further oxygenated sludge preferably flow in cocurrent relation through the digestion stages. Waste sludge is discharged from the final digestion zone stage 23b through conduit 27, and third gas comprising at least 21 percent oxygen is also vented therefrom through conduit 28.

Figure 2:
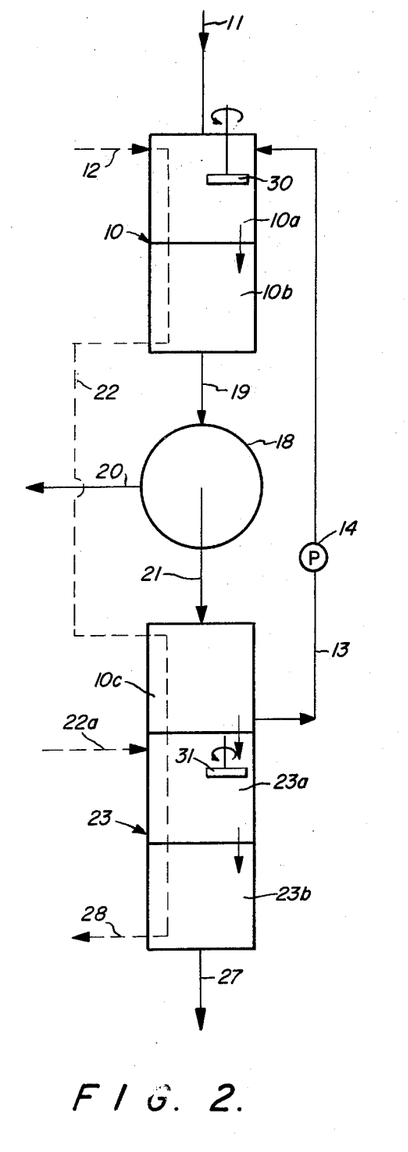
FIG. 2 is a schematic view of another embodiment wherein the clarifier is located after a preliminary section and before a final section of the aeration zone.

The FIG. 2 embodiment differs from FIG. 1 in that aeration zone 10 comprises a preliminary section and a final section separated by the clarifier, and they are operated in the so-called contact stabilization manner. Only sufficient oxygenation is performed in the preliminary section to achieve adsorption of the organic matter on the active bacteria-containing floc. The purified water is then separated and only the concentrated preliminary sludge is treated in the final section of the aeration zone. The liquid-solid contact time of the aeration zone preliminary section is preferably less than about 0.5 of the aeration zone final section.

In FIG. 2 and the succeeding FIGS. 3–6, elements corresponding to FIG. 1 elements have been identified by the same numerals for clarity.

Referring more specifically to FIG. 2, the preliminary section of the aeration zone comprises first stage 10a and second stage 10b. Rotatable surface aerator 30 is provided to serve both the mixing and fluid recirculation functions. Mixed liquor is discharged from the latter in conduit 19 and passed to clarifier 18 for separation into purified liquid and preliminary sludge with adsorbed BOD. The latter is introduced through conduit 21 to third aeration zone 10c comprising the final aeration section for mixing with preliminary unconsumed oxygen-containing gas introduced through conduit 22. The organic food is assimilated and partially oxidized in third aeration zone 10c to form activated sludge. At least 85 percent by weight of the latter is returned to first aeration section 10a and the balance of the activated sludge is introduced to digestion zone 23 for further oxidation by the second gas comprising at least in part the unconsumed oxygen-containing gas from 10c. Rotatable surface aeration 31 is provided in each stage of digestion zone 23 for fluids mixing and recirculation.

The flow of unreturned activated sludge to digestion zone 23 may be either continuous or intermittent. In current practice, excess sludge is often wasted intermittently from the clarifier and the process of this invention may be easily accommodated to such practice. For example referring again to FIG. 1, the digestion zone 23 may be operated on a simple fill-and-draw schedule. A quantity of waste sludge may first be withdrawn from the final digestion stage 23b, the volume of withdrawn waste sludge being equal to a daily quantity of excess activated sludge to be wasted from clarifier 18. After the waste sludge withdrawal is completed, the fresh quantity of excess activated sludge from the clarifier is introduced to first digestion stage. In this mode of operation, the sludge is also intermittently transferred from stage-to-stage in the digestion zone.

Figure 3:
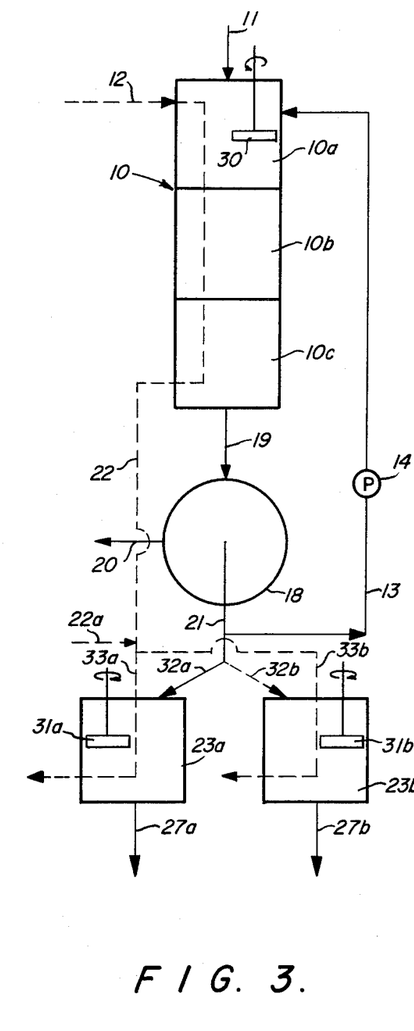
FIG. 3 is a schematic view of still another embodiment with two digestion zones piped in parallel flow relation.

FIG. 3 is still another embodiment similar to FIG. 1 but provided with two digestion zones 23a and 23b piped in parallel flow relation with respect to both excess sludge and second gas. Although only one stage is illustrated in each zone, multiple stages could be provided. The first digestion zone accumulates a charge of excess activated sludge through conduit 21 and branch conduit 32a over an extended period, e.g., three days. Such charge may be accumulated by either continuous or intermittent flow from clarifier 18. The filled first digestion zone 23a is aerated with second gas comprising that discharged from the final aeration stage 10c through conduit 22 and any fresh oxygen in conduit 22a. The aeration or oxygenation period in first digestion zone 23a may be approximately equal to the activated sludge fill time for the digestion zones, after which the digested sludge is discharged through conduit 27a as waste sludge residue. During the first digestion zone 23a oxygenation period after filling of same, the second and alternate digestion zone 23b is being filled with excess activated sludge from clarifier 18 through conduit 21 and branch conduit 32b. To avoid anaerobic conditions during the extended filling step, it is necessary to continuously and simultaneously introduce the second gas to both digestion zones 23a and 23b. This gas in conduit 22 may be divided between branch conduits 33a and 33b for introduction to first and second digestion zones 23a and 23b by appropriate valving (not illustrated) commensurate with the quantity of excess activated sludge in each of these two zones. It will be evident that some digestion will occur during the fill period as the charge of sludge is gradually accumulated with simultaneous oxygen gas mixing. Thus the average residence time of the sludge in the digestion zone will be substantially longer than the oxygenation period following the filling period.

Summarizing the FIG. 3 embodiment, two digestion zones are provided and the second gas is simultaneously introduced to the first zone and the second zone. The unreturned activated sludge is introduced to the first zone for charging thereof and the second gas is simultaneously continuously mixed with previously charged activated sludge in the second zone with one fluid being recirculated against the other fluids therein as the second zone digestion step. Waste sludge and third gas comprising at least 21 percent oxygen are discharged from this second zone after its digestion step. The unreturned activated sludge is then introduced to the emptied second zone for charging thereof and the second gas is simultaneously continuously mixed with the previously charged activated sludge in the first digestion zone while one fluid is recirculated against the other fluids therein as the first zone digestion step. Waste sludge and third gas comprising at least 21 percent oxygen are discharged from the first zone after its digestion step. The emptied first zone and the charged second zone are thereafter respectively returned to the activated sludge charging and digestion step.

The waste sludge residue removed from the digestion zone is greatly reduced in solid content and the solids present therein are comparatively stable. However, complete oxidation of all volatile suspended solids (VSS) in the sludge is not possible because a significant fraction is non-biodegradable. Moreover, complete oxidation of all biodegradable matter is not practical. The biodegradable matter in the sludge mainly comprises cellular material synthesized in the aeration zone. As the cells are oxidized and become fewer in number, the overall rate of oxidation diminishes. Depending upon the composition of the sludge, a practical goal in the aforedescribed embodiments is between about 30 and 70 percent removal of the volatile suspended solids introduced to the digestion zone. In a preferred embodiment of the invention, the volatile suspended solids content of the waste sludge residue is less than about 0.7 of the activated sludge. Normally such reduction of solids will obtain the removal of the putrescible matter in the sludge particularly if the residence time in aeration corresponds to 96 hours or more.

Figure 4:
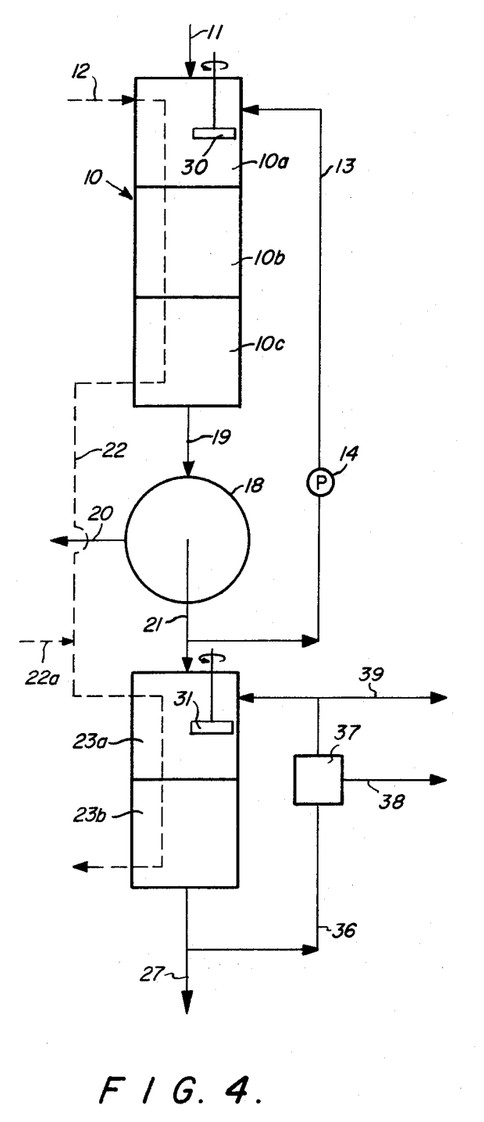
FIG. 4 is a schematic view of an additional embodiment with means for returning waste sludge to the aeration zone and/or the digestion zone.

FIG. 4 illustrates an alternative method for operating the aerobic sludge digestion zone in order to remove a higher fraction of the biodegradable matter and/or to reduce the size of the digestion tanks. At least part of the waste sludge residue in conduit 27 is returned to the first digestion stage 23a and is reprocessed through the digestion stages. The waste sludge residue is directed first through branch conduit 36 to dewatering means 37 such as a filter or centrifuge. The removed water is discarded through conduit 38 and the further concentrated waste sludge is then returned to the first digestion stage 23a. This increases the solids content of the sludge in the digestion zone 23 and increases its digestion residence time without correspondingly increasing the size of the digester tanks.

If all of the waste sludge residue is returned to the digestion zone, the system will be closed with respect to inert matter such as sand which tends to accumulate. The plant may of course be periodically shut down to remove such inerts. Alternatively a fraction of the waste sludge residue may be withdrawn through conduit 27 for external disposition in an amount sufficient to control and stabilize the accumulation of inerts at a tolerable level. As a further alternative, a portion of the dewatered solids may be removed through conduit 39.

Figure 5:
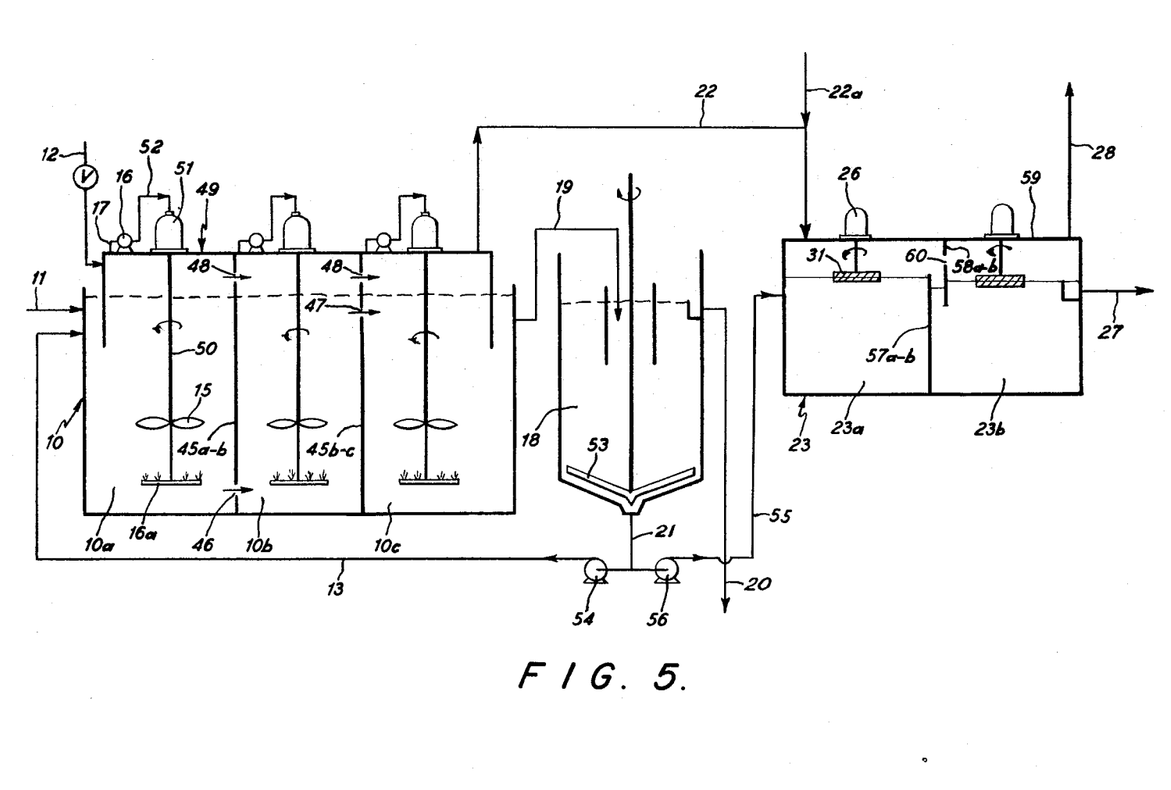
FIG. 5 is a schematic view taken in cross-sectional elevation of apparatus arranged for series and cocurrent flow of oxygen gas and liquid-solid through three aeration tanks, a clarifier, and two digestion tanks in the manner of FIG. 1.

FIG. 5 illustrates apparatus which may be used to practice the FIG. 1 series staged cocurrent gas-liquor flow embodiment. It will also be obvious that this apparatus may be used to practice any of the FIG. 2-4 systems with certain modifications apparent from the preceding description.

The aeration zone 10 is in the form of a tank with vertical partitions 45a–b and 45b–c spaced to provide three compartments 10a, 10b and 10c as the aeration stages. These partitions extend substantially to the base of tank 10 and are joined thereto in fluid-tight relation. Oxygenated liquid-solid flow is provided by restricted flow opening 46 in the first - second compartment common partition 45a–b preferably near or beneath the bottom thereof, and restricted opening 47 preferably in the upper portion of second-third compartment common partition 45 b–c. The unconsumed oxygen-containing gas flows from compartment-to-compartment through restricted openings 48 near the top of the partition. The gas space above each compartment is enclosed by a common cover 49 to which the partition upper means are leak-tightly joined. Accordingly, back mixing of oxygen gas from a succeeding compartment to a preceding compartment is avoided as long as a slight pressure differential is maintained.

The mixing means for each compartment includes blades 15 submerged in the liquor and joined by a rotatable shaft 50 to suitable drive means such as motor 51. Fluid recirculation means comprises withdrawal conduit 17 joined to cover 49, pump 16, return conduit 52 in flow communication with the inlet side of hollow shaft 50 driven by motor 51, and sparger 16a positioned at the lower end of shaft 50 beneath blades 15. The small oxygen gas bubbles discharged from the sparger 16a by the pressure of pump 16 are distributed through each compartment in intimate contact with the liquor and rise through the liquor to the surface where the unconsumed portion disengages into the gas space along with the oxidation reaction product gases.

The mixed liquor discharged from the third and fianl aeration compartment 10c through flow restricting conduit 19 is introduced to clarifier 18 for separation into supernatent liquid and activated sludge. Clarifier constructions are well-known to those skilled in the waste treatment art and may for example include rotatable scraper 53 at the lower end to prevent coning. The activated sludge is withdrawn through bottom conduit 21 and at least 85 percent by weight thereof is recycled through pump 54 in conduit 13 to first oxygenation compartment 10a for mixing with the BOD-containing feed water and oxygen-containing feed gas. The purified liquid is discharged from clarifier 18 through conduit 20.

The unreturned activated sludge is flowed through branch conduit 55 by pump 56 to digestion zone 23 in the form of a tank with lower vertical partition 57 a–b and spaced upper vertical partition 58 a–b dividing the tank into two compartments 23a and 23b. This sludge flow to and through digestion zone 23 may be continuous so that when multiple stages are employed, back-mixing of liquid across restricted openings is desirably inhibited. As previously indicated, the liquid-solid contact time in digestion zone 23 is long as compared to the corresponding time in aeration zone 10, for example 100–200 hours versus 1–2 hours. Moreover the volumetric flow rate of liquid introduced to the digestion zone is very low compared to the liquid introduction rate to the aeration zone, e.g., the former is often less than 5 percent of the latter. Consequently the restricted openings between stages of a multistaged digestion zone must be very small in order to develop sufficient pressure difference across the openings to prevent back-mixing. Small openings are however prone to become plugged, and provision should be made to clean such openings without interrupting operation.

The digestion zone 23 construction of FIG. 5 avoids possible plugging of openings for interstage transfer of partially digested sludge. The sludge level in second stage 23b is lower than the level in first stage 23a, and lower vertical partition 57 a–b acts as a wier over which the sludge must fall in its passage from 23a to 23b. Gas staging is provided by upper vertical partition 58 a–b extending downwardly from the gas-tight cover 59 over the tank into the sludge. Restricted opening 60 in upper vertical partition 58 a–b permits flow of unconsumed oxygen-containing gas from first compartment 23a to second compartment 23b without back-mixing.

Instead of separate liquid-solid mixing means and fluid recirculation means as employed in the aeration tank, rotating surface type impellers 31 are provided for each compartment in the digestion tank 23. Each impeller is joined by a shaft to power means as for example an electric motor 26. The rotating impellers keep the solids in suspension and also throw massive sheets of liquid-solids against the oxygen gas in the overhead space beneath cover 59. In this manner, the liquid-solid continuously recirculated against the gas whereas in the previously described aeration tank the gas is continuously recirculated against the liquid-solid. It should be appreciated that two types of mixing and fluid recirculation apparatus are included in FIG. 5 for purposes of illustration, and either type could be used in both the aeration and digestion tank.

Figure 6:
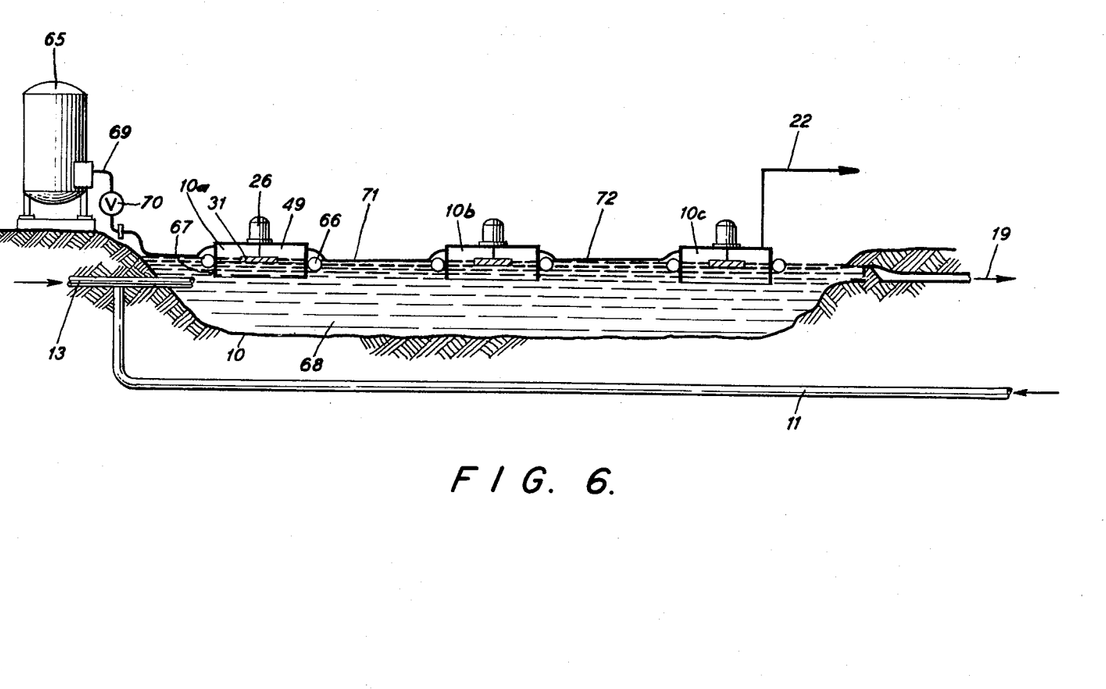
FIG. 6 is a schematic view taken in cross-sectional elevation of apparatus arranged for series flow of oxygen-containing gas through multiple oxygenators in a large first body of waste liquor as an aeration zone.

FIG. 6 shows an aeration zone 10 which may be a fabricated tank but in this embodiment is a naturally formed fluid enclosure as for example a lagoon. BOD-containing feed water enters enclosure 10 through conduit 11 along with the activated sludge through joining conduit 13. An oxygen gas source is provided nearby as for example container 65, the oxygen being stored in liquid or gas form. At least one aeration chamber 10a is provided in lagoon 10, arranged to either float or be supported from the bottom, and three such chambers 10a, 10b and 10c are illustrated as being supported by flotation collars 66. Each chamber has walls 67 with lower ends extending below the level of liquor 68 and upper ends supporting gas-tight covers 49. Means for mixing and fluid recirculation are provided in each chamber and may for example comprise rotating surface type impeller 31 powered by electric motors 26. Conduit 69 with control valve 70 therein is provided between oxygen container 65 and first aeration chamber 10a, and gas comprising at least 60 percent oxygen is supplied therethrough and is mixed with waste liquor to form oxygenated liquid-solid. In this embodiment activated sludge is circulated within the lagoon by natural flow and by impellers 31, and a portion thereof is contacted by the impeller of first chamber 10a. Additional liquid-solid mixing means such as submerged turbines (not shown) may be provided as needed or desired to prevent the solids from gravity-settling to the lagoon floor. Depending on the relative positioning of the feed conduit 13 and first aeration chamber 10a, the feed water-waste liquor mixing may and in fact usually does occur prior to contact with oxygen-containing gas in the first aeration stage.

Restricted passageway means 71 communicates between first chamber 10a gas space and the second chamber 10b gas space, and facilitates flow of unconsumed oxygen-containing gas from the former to the latter. In this particular embodiment, means 71 may be in the form of floating tubing. The unconsumed oxygen-containing gas entering second chamber 10b (of lower oxygen purity than the gas entering first chamber 10a) is mixed with waste liquor in a manner analogous to first chamber 10a, and a second oxygenated liquid-solid is formed which mixes with the waste liquor. It should be noted that in FIG. 6, free mixing occurs between the waste liquor and the oxygenated liquid-solid from each oxygenation stage. Stated otherwise, there is no predetermined liquor flow pattern between the stages. However, the oxygen-containing gas flows in a series manner consecutively from the first to the second to the third oxygenation chamber 10c with progressively decreasing oxygen purity. That is, the unconsumed oxygen-containing gas disengaged from the second oxygenated liquid-solid in chamber 10b flows through restricted passage means 72 to third chamber 13c for mixing therein with the waste liquor. The still unconsumed oxygen-containing gas is discharged from the third chamber gas space through conduit 22 and passed to the digestion zone, as for example tank 23 of FIG. 5. The mixed liquor overflows at 19 and passes to a clarifier as for example depicted in FIG. 5. The recycle activated sludge from the unillustrated clarifier is returned to lagoon 10 through conduit 13.

The total oxygen consumed in a plant practicing this invention will be substantially greater than when at least 60 percent oxygen gas is only fed to the aeration zone and anaerobic sludge digestion is employed. In fact, it has been found that the oxygen requirement for excess sludge oxidation in the digester can be as great as the oxygen requirement for BOD removal in the aeration zone. The relative requirements for oxygen in the digestion zone and in the aeration zone may vary considerably from plant to plant and from day to day, depending upon many factors including the strength of the BOD-containing feed water, the number of new cells synthesized and the number of cells oxidized in the aeration zone.

One or ordinary skill might conclude that discarding the vent gas from the aeration zone and feeding pure oxygen separately to the digestion zone would achieve performance at least as high as when gas from the aeration zone is reused in the digestion zone. For example, if 60 percent oxygen utilization were obtained in each of the two zones on independent oxygen feed streams, the overall oxygen utilization is also 60 percent. Moreover, feeding pure oxygen to the digestion zone would appear to provide a higher oxygen partial pressure in the digester as compared to the integrated oxygen system of this invention wherein $CO_2$ and nitrogen evolved in the aeration zone is carried forward into the digestion zone.

This foregoing presumption is strengthened when the $CO_2$ equilibrium effects are considered. The large volume of the mixed liquor flowing through the AERATION zone provides huge holding capacity for dissolved $CO_2$. As a result, the major portion of the $CO_2$ resulting from oxidation of BOD remains in solution and does not contaminate the aerating gas. On the other hand, the volume of activated sludge flowing through the digestion zone is a very small fraction of the mixed liquor volume and its capacity for dissolving $CO_2$ is correspondingly small. As a result, the major portion of the $CO_2$ generated in oxidizing sludge in the digester is stripped from the liquid into the gas. The problem would seem to be further compounded if $CO_2$ and $N_2$ from the aeration zone is additionally introduced to the digestion zone.

To the contrary, it has been discovered that higher oxygen partial pressure and reduced energy requirements occur in both the digestion zone and the aeration zone when the oxygen supply is integrated in the manner of this invention. The power saving is substantial and is on the order of 15–30 percent.

Table 1 shows data which illustrates the advantage of an integrated oxygen system. The values in the table are computed for a system as shown in FIGS. 1 and 5 herein consisting of three oxygen gas stages in the aeration zone and two gas stages in the digestion zone. In all instances, the feed oxygen is 99.5 percent, and it is assumed that the DO level throughout the aeration zone is 6 ppm. and throughout the digestion zone, 3 ppm. It is further assumed for simplicity that no extensive auto-oxidation is practiced on the mixed liquor upstream of the clarifier and that the total oxygen consumptions in the digestion zone and aeration zone are equal.

Table 1 gives data for the integrated oxygen system of FIGS. 1 and 5 and also for separate oxygen feeds to the aeration zone and to the digestion zone Comparative values are shown for four different percentages of the total feed oxygen utilized in the plant: 60%, 70%, 80% and 92%. The data consists of values of oxygen concentration and values of relative aeration power requirement in each stage of the aeration zone and the digestion zone. The relative aeration power values are power requirements referred to a value of unity assigned to the total aeration power consumed in all three stages of the aeration zone when operated to utilize 92 percent of the oxygen fed thereto. Power required for holding solids in liquid suspension are not included in these ratios. The table further shows total relative aeration power required in each zone, and total relative aeration power required in both zones combined, for each set of parameters.

An inspection of the aeration gas $O_2$ purities in the aeration zone shows a pronounced increase in oxygen purity when the gas system is integrated. For example, at 80 percent utilization, the gas purity in the third stage is 67.8 percent with separate oxygen feed streams and 87.1 percent with an integrated oxygen supply. Higher $O_2$ partial pressures are also obtained in the first and second stages of the aeration zone with the integrated system. The difference in oxygen purities becomes greater at higher oxygen utilization, and at 92 percent utilization, the $O_2$ purity in the third stage is nearly doubled when the gas system is integrated.

Considering now the oxygen purities in the digestion zone, for separate 99.5 percent oxygen supply to the digestion zone, the $O_2$ purity in the first stage is far below the feed gas purity.

32.2 percent for the integrated system compared to 20.8 percent for the separate system - an improvement of over 50 percent.

The following conclusion is drawn for the 80 percent utilization case, and qualitatively is typical for all other cases considered in Table 1: by integrating the gas system, the resultant 87.1 percent $O_2$ transfer gas to the digestion zone obtains higher $O_2$ gas purities in the digestion zone than when a separate 99.5 percent $O_2$ supply is provided therefor. Stated otherwise, integration produces higher oxygen partial pressures in the digestion zone despite a lower purity of oxygen introduced thereto.

It will be noted that the foregoing partial pressure advantage extends throughout the entire range of percentages of $O_2$ utilization from 60 to 92 percent. However, it is also seen that it is not advisable to attempt to achieve high utilizations on the order of 92 percent in the aerobic digestion zone or in an integrated system which includes the aerobic digestion zone. For 80 percent utilization, the $O_2$ purity in the second stage of the digestion zone drops to 20.8 percent or approximately that of air when separate oxygen supplies are provided, and to 32.2 percent when the $O_2$ supply is integrated. For 92 percent utilization, the $O_2$ purity at this point drops below that of air in either system, and therefore, it would be more advantageous to employ air for aeration of the second digestion stage. However, if air were substituted for the oxygen-enriched gas in the second stage, the burden of obtaining high utilization of oxygen in the digestion zone would fall solely upon the first stage. The $O_2$ purity in the first stage will now fall well below the value shown in Table 1. In preferred practice, $O_2$ utilization greater than 80–85 percent should not be attempted when the staged gas system includes an excess sludge digestion zone according to this invention.

TABLE I

[Effect of integration of oxygen supplies for secondary treatment and sludge digestion on power required for gas recirculation]

|  |  | $O_2$ absorption for separate $O_2$ supplies | | | | $O_2$ absorption for integrated $O_2$ supplies | | | |
|---|---|---|---|---|---|---|---|---|---|
|  | Stage | 60% | 70% | 80% | 92% | 60% | 70% | 80% | 92% |
| Percent $O_2$ in recirculating gas stream: | | | | | | | | | |
| Aeration | 1 | 86.2 | 84.4 | 82.5 | 80.0 | 91.0 | 90.2 | 89.4 | 88.5 |
|  | 2 | 82.3 | 78.7 | 74.3 | 67.0 | 89.6 | 88.6 | 87.5 | 86.2 |
|  | 3 | 81.1 | 76.1 | 67.8 | 47.0 | 89.2 | 88.2 | 87.1 | 85.7 |
| Digestion | 1 | 69.8 | 65.1 | 60.3 | 54.8 | 75.0 | 69.4 | 63.0 | 54.1 |
|  | 2 | 40.8 | 30.9 | 20.8 | 9.0 | 55.4 | 44.7 | 32.2 | 15.0 |
| Relative power required for gas recirculation: | | | | | | | | | |
| Aeration | 1 | 0.31 | 0.32 | 0.33 | 0.34 | 0.29 | 0.30 | 0.30 | 0.30 |
|  | 2 | 0.27 | 0.28 | 0.30 | 0.34 | 0.24 | 0.24 | 0.25 | 0.25 |
|  | 3 | 0.16 | 0.17 | 0.19 | 0.32 | 0.14 | 0.14 | 0.14 | 0.15 |
| Total |  | 0.73 | 0.77 | 0.82 | 1.00 | 0.67 | 0.68 | 0.69 | 0.70 |
| Digestion | 1 | 0.44 | 0.48 | 0.52 | 0.58 | 0.41 | 0.45 | 0.50 | 0.60 |
|  | 2 | 0.83 | 1.17 | 2.02 | 14.00 | 0.58 | 0.74 | 1.11 | 3.50 |
| Total |  | 1.27 | 1.65 | 2.55 | 14.59 | 0.99 | 1.19 | 1.60 | 4.09 |
| Aeration plus digestion |  | 2.00 | 2.41 | 3.37 | 15.59 | 1.66 | 1.86 | 2.29 | 4.79 |

For example at 80 percent utilization, the first stage purity is only 60.3 percent. A further drop to 20.8 percent occurs in the second stage. By comparison, the $O_2$ purities in the aeration zone do not decrease nearly as much. This demonstrates the previously discussed $CO_2$ equilibrium effect, and results from the incapacity of the small liquid volume in the digestion zone to retain the $CO_2$ as it is produced.

With the integrated gas system of this invention, the same $CO_2$ equilibrium effect is noted but to significantly less degree. The $O_2$ purities in the aeration zone remain almost steady and at high values due to the high capacity of the liquid for $CO_2$ and due to the much larger volume of oxygen flowing through the aeration zone. The gas fed to the digestion zone is the same gas existent in the third stage of the aeration zone and its purity is relatively high. Again the oxygen purity drops abruptly in stages of the digestion zone but not to the low level observed with separate $O_2$ supply. For example, at 80 percent utilization, the second stage gas purity in the digestion zone is With respect to the relative power values of Table 1, it is seen that a value of 1.0 has been assigned the power requirement of a three-stage aeration zone achieving 92 percent $O_2$ utilization. Operating the aeration zone in this manner represents excellent economy as demonstrated in actual operation of the cocurrent, staged aeration system of FIGS. 1 and 5 using municipal wastewater as the BOD-containing feed. Comparing the power consumed in the digestion zone for the same case, i.e., separate $O_2$ supplies and 92 percent $O_2$ utilization, the relative power consumed in the digestion zone is 14.6 times that in the aeration zone, demonstrating dramatically the adverse effect of the very low $O_2$ partial pressure (9% $O_2$) in the second stage. By comparison, the integrated oxygen system operated for 92 percent utilization requires only 0.7 relative power in the aeration zone and only 4.1 relative power in the digestion zone.

Again the surprising economy of the integrated system is emphasized: with separate 99.5 percent $O_2$ feeds to the aeration zone and digestion zone, the total relative power value is 15.6; but with 99.5% $O_2$ fed to the aeration zone only, the total relative power is reduced 69 percent to 4.8 despite a gas feed purity of only 85.7% $O_2$ to the digestion zone.

The second gas introduced to the digestion zone preferably comprises at least 80 percent oxygen at least 70 percent of the oxygen in the first gas is preferably consumed in the aeration and digestion zones.

Table II shows the power reductions obtained with the integrated $O_2$ supply for all oxygen-utilization cases listed in Table I.

TABLE II

| % $O_2$ Absorption | Relative Power Separate $O_2$ Supply | Relative Power Integrated $O_2$ Supply | % Power Reduction |
| --- | --- | --- | --- |
| 60% | 2.0 | 1.7 | 17% |
| 70% | 2.4 | 1.9 | 23% |
| 80% | 3.4 | 2.3 | 32% |
| 92% | 15.6 | 4.8 | 69% |

In summary, Table 1 illustrates that the third gas discharged from the digestion zone must comprise at least 21 percent oxygen. Otherwise the power requirement becomes inordinately high for continuous recirculation of one fluid against the other in this zone in order to achieve the required mass transfer of oxygen from the aeration gas. As previously stated, the feed (first) gas to the aeration zone should comprise at least 60 percent oxygen and preferably at least 90 percent oxygen (by volume). Table 1 is based on an oxygen feed gas purity of 99.5 percent. If the purity of the feed oxygen is reduced substantially, the effect on mass transfer of the diluent nitrogen introduced with the feed gas (assuming an $O_2$-$N_2$ mixture as this gas) begins to overshadow the effect of nitrogen and carbon dioxide evolved from the liquor during aeration. Therefore, reducing the oxygen feed gas purity tends to diminish the relative advantage of the integrated oxygen system of this invention over the separate oxygen supply systems to the aeration and digestion zones. Moreover, since the effect of reducing feed gas oxygen purity is to reduce oxygen partial pressures through the system, it is evident from the trend of data in Table 1 that the 21 percent oxygen vent gas lower limit composition will be reached at lower oxygen absorption efficiencies when the oxygen feed gas purity to the aeration zone is reduced. For example, Table 1 suggests that with the 21 percent oxygen lower limit on the digestion zone vent gas, the $O_2$ absorption efficiency cannot exceed about 85 percent based on 99.5 percent oxygen feed gas to the aeration zone. However if the feed gas is 80 percent oxygen, the $O_2$ absorption efficiency can only be about 75 percent consistent with the 21 percent lower limit on oxygen content of the vent gas. The digestion zone is much more sensitive to feed gas purity than the aeration zone because of the more pronounced effect of impurity evolution into the gas space. Accordingly, the oxygen feed gas purity to the aeration zone must at least be 60 percent to achieve reasonable $O_2$ absorption efficiency without excessive power consumption.

Although certain embodiments have been described in detail, it will be appreciated that other embodiments are contemplated along with modifications of the disclosed features, as being within the scope of the invention.

What is claimed is:

1. In a method for treating BOD-containing water by aeration in contact with activated sludge, settling sludge from the aeration and recycling sludge to the aeration zone as said activated sludge, the improvement comprising:
   a. introducing first gas comprising at least 60 percent oxygen (by volume) and mixing same as the aeration gas with the BOD-containing water and recycled sludge and simultaneously continuously recirculating one of such fluids against the other fluids in the aeration zone for liquid-solid contact time of between 30 minutes and 24 hours, in sufficient quantity and rate to maintain the dissolved oxygen content (DO) of the mixed liquor above about 0.5 ppm.;
   b. separating the mixed liquor into purified liquid and activated sludge;
   c. discharging unconsumed oxygen-containing gas from said aeration zone;
   d. providing second gas having oxygen concentration at least 0.70 times the first gas oxygen concentration and at least in part comprising said unconsumed oxygen-containing gas;
   e. returning at least 85 percent by weight of said activated sludge to said aeration zone as said recycled sludge;
   f. introducing said second gas and the unreturned activated sludge to a digestion zone and mixing same for liquid-solid contact time of at least 96 hours and simultaneously continuously recirculating one of such fluids against the other fluids; and thereafter
   g. discharging waste sludge residue and third gas comprising at least 21 percent oxygen from said digestion zone.

2. A method according to claim 1 wherein said aeration zone comprises a preliminary section and a final section, mixed liquor and preliminary unconsumed oxygen-containing gas are discharged from said preliminary section after preliminary mixing and recirculation of one fluid against the other fluids, said mixed liquor is separated into supernatent liquid and preliminary sludge, said preliminary unconsumed oxygen-containing gas and said preliminary sludge are introduced to said final section of the aeration zone for further mixing and recirculation of one fluid against the other fluids, further unconsumed oxygen-containing gas is discharged from said final section as at least part of said second gas, and said activated sludge is also discharged from said final section.

3. A method according to claim 1 wherein the volatile suspended solids content (VSS) of said waste sludge residue is less than about 0.7 of said activated sludge.

4. A method according to claim 1 wherein said aeration zone and said digestion zone each comprises at least two stages wherein unconsumed oxygen-containing gas is discharged from the first stage and introduced to the second stage as the aeration gas therefor.

5. A method according to claim 1 wherein said aeration zone and said digestion zone each comprises at least two stages wherein unconsumed oxygen-containing gas is discharged from the first stage and introduced to the second stage as the aeration gas, oxygenated liquor is discharged from the first stage and introduced to the second stage in cocurrent flow relation with said unconsumed oxygen-containing gas for mixing therewith and recirculation of one fluid against the other fluids.

6. A method according to claim 2 wherein the liquid-solid contact time of the aeration zone preliminary section is less than about 0.5 of the aeration zone final section such that said preliminary sludge contains unassimilated BOD and said activated sludge is substantially devoid of unassimilated BOD.

7. A method according to claim 1 wherein two digestion zones are provided, said second gas is simultaneously introduced to a first zone and a second zone, said unreturned activated sludge is introduced to said first zone for charging thereof and the second gas is simultaneously continuously mixed with previously charged activated sludge in said second zone with one fluid recirculated against the other fluids in said second zone as its digestion step; waste sludge residue and third gas are discharged from said second zone after its digestion step; said unreturned activated sludge is thereafter introduced to the emptied second zone for charging thereof and the second gas is simultaneously continuously mixed with the previously charged activated sludge in said first zone with one fluid recirculated against the other fluids in said first zone as its digestion step; waste sludge residue and third gas are discharged from said first zone after its digestion step; the emptied first zone and charged second zone are thereafter respectively returned to the activated sludge charging and digestion steps.

8. A method according to claim 1 wherein said second gas has oxygen concentration at least 0.80 times the first gas oxygen concentration.

9. A method according to claim 1 wherein water is removed from at least part of said waste sludge residue and the dewatered waste sludge residue is returned to said digestion zone.

10. A method according to claim 1 wherein said first gas comprises at least 90 percent oxygen (by volume), said second gas comprises at least 80 percent oxygen, and at least 70 percent of the oxygen in said first gas is consumed in said aeration and digestion zones.

11. A method according to claim 1 wherein additional gas comprising at least 60 percent oxygen (by volume) is externally supplied as part of said second gas.

* * * * *